Feb. 6, 1940.  P. C. KEITH, JR  2,189,265
MANUFACTURE OF GASOLINELIKE HYDROCARBONS
Original Filed Oct. 30, 1935
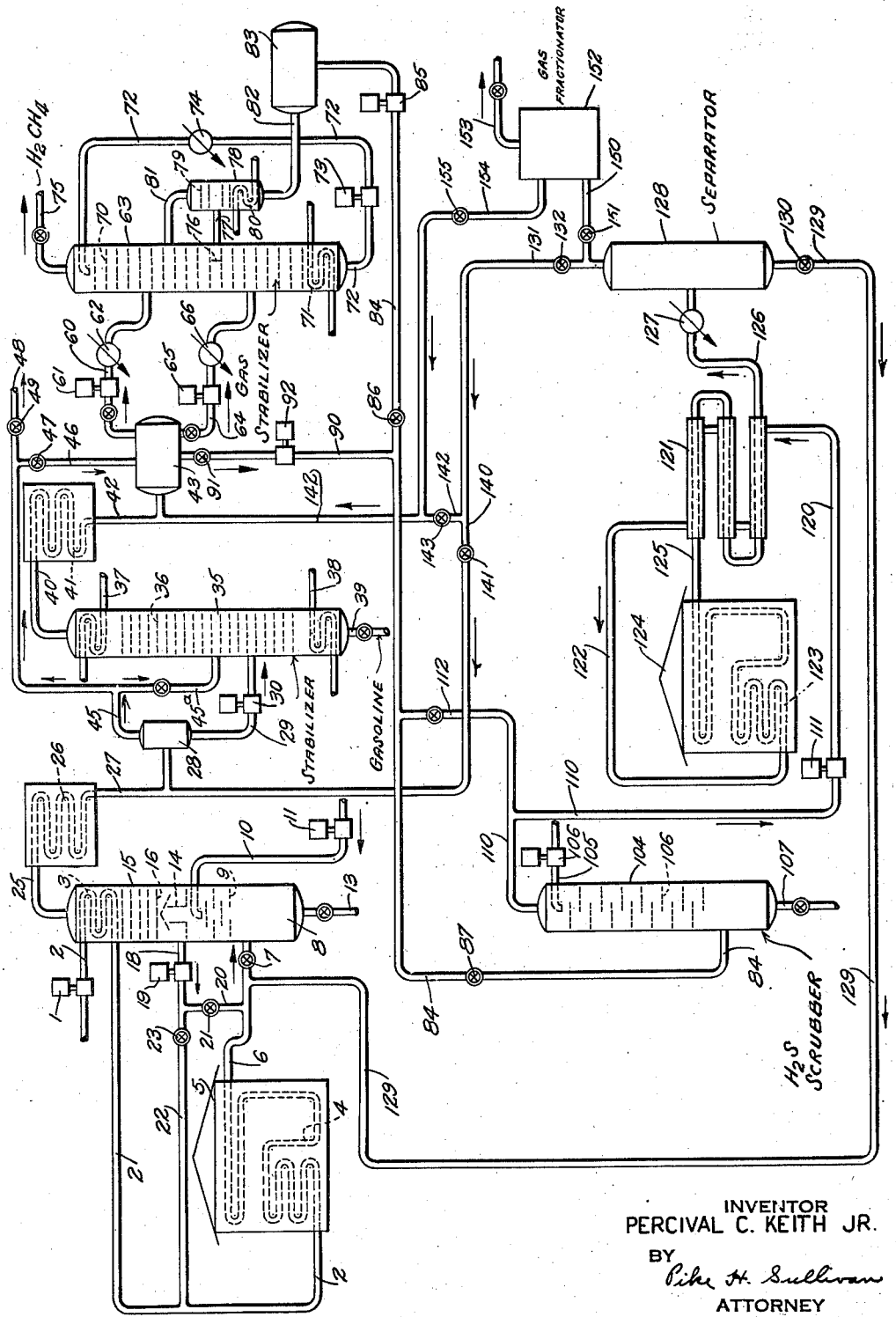
INVENTOR
PERCIVAL C. KEITH JR.
BY
ATTORNEY Patented Feb. 6, 1940

2,189,265

UNITED STATES PATENT OFFICE 2,189,265

MANUFACTURE OF GASOLINELIKE HYDROCARBONS

Percival C. Keith, Jr., Peapack, N. J., assignor to Process Management Company, Inc., New York, N. Y., a corporation of Delaware Application October 30, 1935, Serial No. 47,414
Renewed July 15, 1939

11 Claims. (Cl. 196—10)

My invention relates to the manufacture of normally liquid gasolinelike hydrocarbons, that is to say, hydrocarbons having boiling points lying within a gasoline or motor-fuel boiling point range, from normally gaseous hydrocarbons of lower molecular weight, and more particularly to a process for effecting the conversion or polymerization of hydrocarbon gases produced in the pyrolysis of hydrocarbon oils, and containing both saturated and unsaturated hydrocarbon constituents, to low-boiling, normally liquid gasolinelike products suitable for use as a motor fuel.

The products of the pyrolysis of hydrocarbon oils include below the gasoline boiling-point range varying quantities of hydrogen, methane, ethane, ethylene, propane, propylene, butane and butylenes, and as separated in oil-cracking operations the uncondensable gases may also contain limited quantities of heavier hydrocarbons such as pentane, hexane and other hydrocarbons having five and six carbon atoms per molecule. It has been known in the art for some time that such gases can be polymerized to higher-boiling normally liquid non-aromatic products under high pressure and at temperatures ranging from about 750° to 1250° F.

My invention has for an object the provision of a process of the character and for the purpose indicated, wherein hydrocarbon gases such as those produced in the pyrolytic decomposition of hydrocarbon oils, after separation of hydrogen and methane are converted to normally liquid gasolinelike hydrocarbons of high anti-knock value when used as motor fuel, together with such additional operative improvements and advantages as may hereinafter be found to obtain.

My invention contemplates a continuous and cyclic process for obtaining low-boiling hydrocarbon liquids of a gasolinelike nature from normally gaseous hydrocarbons such as those produced in the pyrolysis or cracking of hydrocarbon oils, in which gases substantially free from hydrogen and methane are subjected to high pressures of from 500 to 3000 pounds per square inch or higher and temperatures ranging from about 750° to 1250° F. but preferably from about 1000° F. to about 1100° F. for a period of time sufficient to effect the desired polymerization reactions. The products of polymerization are cooled to effect the separation of normally liquid products of gasolinelike nature as well as any higher-boiling products which may be formed, and the uncondensed gases and vapors are fractionated to remove hydrogen, methane and excessive quantities of ethane and then recycled.

I have found that it is of great importance to fractionate the gases prior to such conversion to separate hydrogen and methane as completely as possible, and also where necessary to separate ethane to some extent, as will be explained more fully hereinbelow. Such fractionation may be accomplished upon the composite stock consisting of the fresh feed and the recycled stock, or the fresh feed and the recycled stock may be separately fractionated.

Where my process is operated in conjunction with an oil-cracking unit, as will be made more clear hereinbelow, the fractionation of the gaseous products of oil cracking may obviously be conducted in different manners prior to their use for polymerization in accordance with our process. Thus, in oil-cracking plants operated at low pressures and producing relatively "wet" gases, such gases may be fractionated after removal of the cracked gasoline in the manner indicated hereinabove, whereas in oil-cracking plants operating under high pressure, most or all of the constituents desired for polymerization may be actually removed from the condenser in liquid form with the gasoline, to be recovered in the course of stabilization. In some instances, the overhead products from the cracked-gasoline stabilizer may even be sufficiently free from hydrogen and methane to require no further fractionation prior to conversion. In other instances, however, gases from the gas separator of an oil-cracking unit may be combined with overhead or reflux from the gasoline stabilizer, the combined products then being fractionated for the removal of hydrogen and methane (as well as all or a portion of the ethane where desired) prior to conversion. The particular fractionating method employed will depend upon the composition of the normally gaseous products of cracking as well as the pressures and temperatures under which the condensation and separation of the cracked gasoline is effected. It will also depend to some extent on whether or not the recycled stock from the gas-conversion unit is separately fractionated or is recycled to the oil-cracking operation for fractionation along with the products of cracking.

In order that my invention may be fully set forth and understood, I now describe, with reference to the drawing accompanying and forming a part of this specification, a preferred form and manner in which my invention may be practiced and embodied. In the drawing, The single figure is a more or less diagrammatic elevational view of apparatus for effecting the polymerization of hydrocarbon gases in accordance with my invention, including also apparatus for cracking hydrocarbon oils to produce motor fuel and gases for polymerization, and illustrating an advantageous manner in which an oil-cracking unit may be combined with a gas-polymerizing unit operated in accordance with my invention.

In the instance illustrated in the drawing, I have shown an oil-cracking unit which is operated for the purpose of reforming naphtha, i. e., of converting naphtha of relatively low anti-knock value into motor fuel of higher anti-knock value. As is well known, such a reforming operation ordinarily results in the formation of considerable quantities of fixed gases and constituents lower boiling than are desired to be included in the final motor-fuel product. My process makes it possible to effect the conversion of such gaseous constituents exclusive of hydrogen and methane to hydrocarbon liquids useful as motor fuel and possessing extremely high anti-knock value, which may be blended, if desired, with the reformed gasoline produced in the cracking operation. While the gas-polymerizing process of my invention is extremely well suited to combination with a reforming unit of this character, it will be understood by those skilled in the art that my process may be employed in conjunction with other types of oil-cracking operations, for example those operated for the purpose of obtaining gasoline and gases from relatively heavy oils such as gas oil, reduced crude and the like.

Referring now specifically to the drawing, an oil to be cracked, such for example as a naphtha of relatively low anti-knock value and, it may be, a naphtha having a slightly higher end boiling-point than that of the desired final motor-fuel product, or a relatively heavy oil, such as gas oil, is introduced by means of a pump 1 and a line 2 wherein is located a heat-exchange coil 3 into a heating coil 4 located within a suitable heating furnace 5. As the oil passes through the coil 4, it is subjected to a cracking temperature of, for example, from 850° to 1050° F. and preferably in the instance illustrated to a temperature of about 975° F., under a pressure preferably in excess of 100 pounds per square inch, for example about 800 pounds per square inch or higher, for a sufficient period of time to insure the desired degree of cracking of the oil. Where naphtha of low anti-knock value is used as charging stock, cracking is effected merely to such extent as to effect a material increase in the anti-knock values, without materially changing the boiling point range, but on account of the rather refractory nature of naphtha, fairly high cracking temperatures are necessary and the production of a considerable amount of gas is practically inevitable.

The heated products from the pipe coil 4 then pass through a transfer line 6 wherein is located a pressure-reducing valve 7 into an evaporator 8 maintained at a lower pressure than that obtaining in the coil 4. By way of example, in the present instance, in which a pressure of 800 pounds per square inch is maintained in the coil 4, the evaporator 8 may be maintained at a pressure of 300 pounds per square inch or higher.

The evaporator 8 may be provided, as illustrated, with suitable baffles 9 and with cooling means such as a line 10 wherein is located a pump 11 for introducing a suitable hydrocarbon oil. As the products from the transfer line 6 enter the evaporator 8, volatile portions thereof are liberated, and residual portions are withdrawn from the bottom of the evaporator 8 through a valved line 13. Where desired, residual oil or tar withdrawn through the line 13 may be flashed at a lower pressure in a suitable tar flasher (not shown) and distillate thus produced may be returned to the cracking system as, for example, by way of the line 10.

Vapors pass from the evaporator 9 to a fractionating column 15, the interior of which is provided with suitable plates or trays 16 and wherein may be located the heat-exchange coil 3. Passing upward through the fractionating column 15, the vapors are subjected to partial condensation and fractionation for the purpose of condensing and removing constituents heavier than the desired final gasoline product. A portion of the condensate thus obtained is removed from the trap-out tray 14 through a line 18, wherein may be located a pump 19, and delivered through a branch line 20 having a valve 21 to the transfer line 6 where it is employed for the purpose of quenching the hot products from the coil 4 to a temperature below an active cracking temperature, for example from about 750° to 850° F. Condensate withdrawn through the line 18 in excess of that required for quenching the products from the coil 4 is delivered through a line 22 having a valve 23 to the line 2 as recycle stock for the coil 4.

The fractionated overhead vapors from the fractionating column 15 pass through a vapor line 25 to a condenser 26 operated approximately at atmospheric temperature or at any rate employing as a cooling medium water at atmospheric temperature or a little below, and the partially condensed products then pass through a line 27 to a gas separator 28 preferably maintained under a pressure slightly below that obtaining in the fractionating column 15, for example about 290 pounds per square inch.

In the separator 28, gasoline condensate separates from uncondensed gases. If the pressure in the separator is high enough, the separated gases may consist substantially entirely of hydrogen and methane; at lower pressures, higher-boiling constituents may separate in gaseous form. The condensate passes through a line 29 wherein may be located a pump 30 to a gasoline stabilizer or rectifying column 35 provided with suitable plates or fractionating trays 36, a cooling coil 37 and a heating coil 38. The stabilizer 35 is operated for the purpose of removing constituents from the condensate which are too light to be included in the final gasoline product, and is preferably held under a superatmospheric pressure at least not materially below that obtaining in the separator 28, for example about 280 pounds per square inch or higher. Stabilized gasoline is withdrawn from the bottom of the stabilizer 35 through a valved line 39, while overhead vapors pass through a vapor line 40 to a condenser 41 and thence through a line 42 into an accumulator 43. Uncondensed gases from the separator 28 are removed therefrom through a line 45 and may pass through a branch line 46 having a valve 47 into the accumulator 43, or may be withdrawn from the system through a branch line 48 having a valve 49.

Whether or not the gases from the separator 28 are withdrawn from the system or passed to the accumulator 43 will depend upon the nature of these gases. Where the separator 28 is operated at high pressure, for example 500 pounds per square inch, and the separated gases consist substantially entirely of hydrogen and methane, or of hydrogen, methane and ethane without substantial quantities of propane, propylene, butane or butylene, they may be removed from the system. In such event, the overhead products from the stabilizer 35, or reflux therefrom, may be sufficiently free from hydrogen, methane and ethane to remove the necessity for further fractionation before being subjected to conversion. If, however, the gases removed from the separator 28 contain substantial amounts of constituents such as propane, propylene, butane and butylene, they may be fractionated separately to recover these constituents for conversion or they may be delivered to the accumulator 43 and mixed with overhead or reflux from the stabilizer 35 prior to fractionation, or they may be delivered by means of a valved line 45a to the stabilizer 35.

In the latter instance, gases are withdrawn from the accumulator 43 through a line 60 and compressed by means of a pump or compressor 61 to a relatively high pressure of for example from 300 to 500 pounds per square inch. The heat of compression may be removed by means of a cooler 62 located in the line 60. The compressed gas then passes through the line 60 to a gas stabilizer, fractionator or rectifier 63. Liquid from the accumulator 43 is delivered to a lower point in the gas stabilizer 63 through a line 4 wherein is located a pump 65, by means of which such condensate is also placed under a pressure of from 300 to 500 pounds per square inch, or whatever pressure is maintained in the stabilizer 63. A cooler 66 may be provided in the line 64 if so desired.

The gas stabilizer 63 is internally provided with suitable plates or trays 70 and with a heating coil 71 located in the lower portion thereof. Bottoms from the tower 63, comprising principally liquefied butane, as well as heavier hydrocarbons, such as pentane, if present, are withdrawn therefrom through a line 72 wherein is located a pump 73, and after being passed through a cooler 74 are returned to the upper portion of the tower 63 as a refluxing and absorbing medium. The cooler 74 is preferably operated in such manner as to effect cooling of the constituents thus returned to a temperature not above atmospheric and preferably lower, for example, from 0° C. or even lower to 10° C. Fixed gaseous constituents, comprising principally hydrogen and methane, are withdrawn from the top of the gas stabilizer 63 through a valved line 75. The operation of the stabilizer 63 is so conducted that gases thus withdrawn comprise substantially all of the hydrogen and methane but are substantially free from higher constituents, and at any rate preferably do not contain more than 10% of the convertible unsaturated constituents.

Where desired, the gases removed at 75 may be scrubbed with a suitable solvent such as gas oil to recover butane and the like therefrom, the latter being recovered from the enriched solvent and returned to the gas fractionator.

By means of a weir 76 located at an intermediate portion of the gas-stabilizer 63, reflux is withdrawn as a side stream through a line 77 and passes to a stripper 78 having plates or trays 79 and heating means such as the coil 80 located therein, and wherein any hydrogen, methane and excess ethane contained in the side stream thus withdrawn is driven off and returned to the gas-stabilizer 63 through a line 81. The stripped compressed liquid, consisting principally or entirely of propane, propylene, butane and butylene, but sometimes containing some ethane and ethylene as well as pentane and heavier hydrocarbons, then passes through a line 82 to a tank 83.

While I have illustrated and described a preferred type of gas-fractionating system, it will be understood that my invention in its broader aspects is not limited to the use of the particular type illustrated, as the fractionation of the gases prior to conversion thereof may be accomplished in other suitable manners, if desired. The type of operation illustrated is, however, well adapted for use in the process of my invention.

Before subjecting the hydrocarbons collected in the tank 83 to polymerization, it may prove highly desirable to remove hydrogen sulphide therefrom, for the reason that if hydrogen sulphide is permitted to pass in any considerable amount with the hydrocarbons through the polymerizing zone it will tend to be chemically combined with the hydrocarbons resulting from the polymerization treatment, and would result in a final gasoline product difficult to treat for removal of sulphur impurities. In the instance disclosed in Fig. 1, I have illustrated, by way of example, means for removing hydrogen sulphide comprising an absorber wherein the gases are subjected to contact with a suitable chemical adsorbent having the property of chemically combining with and removing hydrogen sulphide from the hydrocarbons.

Hydrocarbons collecting in the tank 83 may pass by way of a line 84, wherein may be located a pump 85 and valves 86 and 87 to a scrubber 104.

As the hydrocarbons pass upward through the scrubber 104 they are subjected to countercurrent contact with a flow of a suitable hydrogen-sulphide absorbent, such for example as an aqueous solution of sodium hydroxide, sodium carbonate, or any other suitable agent, introduced into the upper portion of the scrubber 104 through a line 105 wherein may be located a pump 106. The scrubber 104 may be provided, as shown, with a plurality of baffles 106 or other suitable gas-and-liquid-contact devices for promoting efficient contact between the hydrocarbons and the liquid washing medium. Spent washing medium is removed from the bottom of the scrubber 104 through a valved line 107, while the hydrocarbons thus freed wholly or to the desired extent from hydrogen sulphide pass through a line 110 to a pump 111 for compression.

By regulating the pressure on the hydrocarbons undergoing treatment, as for example by means of the valve 87 and the compressor 85, removal of hydrogen sulphide may be effected while the hydrocarbons remain in the liquid phase or, under lower pressures, in the vapor phase, as desired.

It will be obvious to those skilled in the art that various types of treating solutions may be employed in the scrubber 104. Preferably these will be aqueous in character, especially where the hydrocarbons treated are in the liquid phase, inasmuch as aqueous fluids are immiscible therewith and may readily be separated therefrom. Instead of employing a solution of caustic soda, I may employ various solutions, preferably also of an alkaline character such for example as a solution of sodium carbonate phenolate, or thioarsenate. The latter solutions have the advantage over caustic soda solutions in that they may readily be regenerated and reemployed for further hydrogen-sulphide removal.

By means of a valved by-pass line 112, the hydrocarbons passing to the gas conversion operation may be by-passed around the absorber 104 wherever removal of hydrogen sulphide therefrom proves unnecessary or undesirable.

Where conditions of operation are such that a sufficiently sharp separation between hydrogen and methane on the one hand and higher-boiling hydrocarbons on the other hand is effected in the separator 28, and the gases separated at this point can therefore be removed from the system, or where the gases separated in the separator 28 are removed from the system at that point for any reason, regardless of their nature, and the material supplied to the accumulator 43 is sufficiently free from hydrogen and methane (by reason of prior fractionation or separation), then the fractionator 63 may be omitted and the material from the accumulator 43 may be delivered directly through a line 90 having a valve 91 and the line 84 or the line 112 to the absorber 104 or the compressor 111, respectively, as desired. A compressor 92 may be located in the line 90, for use where necessary or desirable.

The hydrocarbons passing through the line 110 are compressed by means of the pump 111 to a pressure of from 500 to 3000 pounds per square inch and preferably from about 800 to 1000 pounds per square inch, and then pass by way of a line 120 to a heat exchanger 121, and thence by way of a line 122 to a heating coil 123 located within a suitable furnace 124. Here the compressed gases are heated to a temperature at which active polymerization takes place. While I prefer to employ temperatures of from 1000° to 1100° F., somewhat higher or lower temperatures may be employed if desired. However, temperatures lower than 750° F. and higher than 1250° F. are ordinarily not desirable or advantageous. The hot products then pass through a line 125 to the heat-exchanger or soaker 121 where they are soaked for a sufficient period of time, for example 90 seconds (total time of contact in heating coil and soaker) to effect the desired degree of conversion.

In general, higher pressures and high olefin-content favor lower temperatures and vice versa. If catalysts are employed, considerably lower temperatures may be used, depending upon the particular catalyst employed as well as the other factors of operation.

Ordinarily, I have found that, in operating in the manner set forth herein, the reactions taking place in the soaking coil 121 are not highly exothermic in character, but may be slightly so, and the heat exchanger or soaker 121 is ordinarily so operated as to effect, at least in the first stages thereof, merely a balancing of such exothermic reactions as may occur, and to maintain the gases at the desired active polymerizing temperature for a sufficient soaking period. In the latter stages of the soaker 121, however, considerable cooling may be effected even to a point materially below an active polymerizing temperature. While I have not illustrated the details of the soaker 121, it is contemplated that the flow of the feed gases therethrough may be variably regulated through the several portions thereof in order to provide a variable control of the soaking and cooling of the products from the coil 123.

The latter pass from the soaker 121 through a line 126, wherein may be located a cooler or condenser 127, preferably operated at atmospheric temperature or thereabout, into a high-pressure separator 128, which is preferably operated at a pressure not materially lower than that obtaining in the coil 123. Here a separation of liquid products of polymerization from unpolymerized gases occurs, the liquid polymers comprising principally liquid boiling within the general boiling-point range of gasoline or motor fuel being withdrawn through a line 129 wherein is located a valve 130, while the uncondensed gases are withdrawn through a line 131 wherein is located a valve 132. In this instance, the liquid products withdrawn through the line 129 are returned to the oil-cracking unit for recovery. Thus, as illustrated in the drawing, these products may be introduced into the line 6 ahead of the pressure-reducing valve 7, to pass with the products from the coil 4 into the evaporator 8. Operating in this manner, the liquid thus introduced into the line 6 serves as a quenching medium for the products passing therethrough, and the gasoline-like constituents recovered from the polymerizing operation are condensed at 26 and stabilized in the stabilizer 35. It will be obvious, however, that a separate fractionating and condensing system, and if necessary a separate stabilizing system, may be employed if desired.

In any event, the fixed gases produced in the gas-polymerization operation are fractionated to remove hydrogen and methane and recycled to the gas-polymerizing operation. As shown in the drawing, this may be accomplished in one of several manners; the gases may be delivered through a branch line 140 having a valve 141 to the line 27 and thence into the separator 28, or, where the products withdrawn from the accumulator 43 are fractionated, as at 63, prior to conversion, they may be delivered to the accumulator 43 through a line 142 having a valve 143 and communicating with the line 42 which leads to the accumulator 43. In this instance, these gases traverse the gas-fractionating tower 63 together with gases produced in the oil-cracking unit and are fractionated before being returned to the coil 123.

As a further alternative, where hydrocarbons from the accumulator 43 are to be passed directly to the conversion system through the line 90, the overhead products from the separator 128 may be passed through a branch line 150 having a valve 151 to a suitable fractionating device indicated diagrammatically at 152, for removal of hydrogen and methane, as well as ethane to the desired extent. The thus separated fixed gases are removed at 153 while the fractionated recycle stock then passes to the accumulator 43 through a line 154 having a valve 155 and communicating with the line 142. In this instance, the valve 132 is closed. Obviously, various types of gas-fractionating means may be employed for this purpose. Alternatively, the liquid products from the conversion operation may be condensed under pressure, separated from fixed gases, and stabilized, the overhead from the stabilizer then passing to the accumulator 43.

While I have illustrated in the drawing a soaking coil 121 it will be understood that enlarged soaking chambers may be employed, if desired. However, I have found that the best results are obtained when both the heating coils and the soaking coils are constructed of relatively small diameter tubing.

The polymerized gasoline produced in accordance with the process of our invention represents a very advantageous and valuable product. The anti-knock value of this gasoline is exceptionally high, for example, above 80 in octane rating, but it is predominantly non-aromatic. It will be understood by those skilled in the art that the gasoline recovered from the stabilizer 35 of Fig. 1 will, of course, contain a considerable proportion of cracked or reformed gasoline, and consequently may not be expected to have as high an anti-knock value as that of the polymerized gasoline-like product alone. In fact, the gasoline recovered from the stabilizer 35 of Fig. 1 represents a blended product, containing both cracked and polymerized gasoline, and consequently partakes of the characteristics of each.

While I have described my invention hereinabove with respect to various specific operating examples and details, it will readily be understood by those skilled in the art that my invention is not limited to such illustrative details or examples but may variously be practiced and embodied within the scope of the claims hereinafter made.

I claim:

1. The process of obtaining normally liquid low boiling hydrocarbons suitable for use as motor fuel from hydrocarbon oil which comprises subjecting said hydrocarbon oil to pyrolytic conversion treatment to form hydrocarbons suitable as gasoline constituents, separating from the products of said conversion treatment a gaseous fraction containing hydrogen and methane and saturated and unsaturated hydrocarbons having two to four carbon atoms per molecule, introducing said gaseous fraction into a fractionating zone at a point intermediate the upper and lower portions thereof, fractionating said gases in said zone into a fixed gas fraction predominating in hydrogen and methane and a liquefied gas fraction predominating in hydrocarbons having two to four carbon atoms per molecule, withdrawing a liquefied side stream from said fractionating zone at a point intermediate the upper and lower portions thereof, heating the lower portion of the fractionating zone to strip light constituents from the liquefied gases contained therein, withdrawing said liquefied gases stripped of light constituents from said lower portion of said fractionating zone, cooling said withdrawn liquefied gases, introducing said cooled liquefied gases into the upper portion of said fractionating zone whereby said cooled liquefied gases pass downwardly through said fractionating zone in intimate contact with the gases ascending said fractionating zone to effect condensation and absorption of hydrocarbons having two to four carbon atoms per molecule, separately subjecting said side stream to elevated temperature and superatmospheric pressure to effect conversion thereof to normally liquid products including gasolinelike material, separating the products of said last-mentioned conversion operation into a normally liquid fraction and a normally gaseous fraction, admixing said last-mentioned normally liquid fraction with the products of pyrolytic conversion of said hydrocarbon oil whereby cooling of said products is effected and said normally liquid fraction is fractionated with said products of pyroytic conversion, and returning said normally gaseous fraction from said gas conversion operation to said fractionating zone for separation into a fixed gas fraction and a liquefied gas fraction as described.

2. The method in accordance with claim 1 wherein said first-mentioned gaseous fraction is first separated into a liquefied fraction and a gaseous fraction, said liquefied fraction is introduced into said fractionating zone at an intermediate point adjacent the lower portion thereof and said gaseous fraction is introduced into said fractionating zone at an intermediate point adjacent the upper portion thereof.

3. The method in accordance with claim 1 wherein said liquefied side stream is heated externally of said fractionating zone to strip light constituents therefrom, said light constituents are returned to said fractionating zone at a point intermediate the upper and lower portions thereof, and the remaining liquefied portion stripped of light constituents is passed to said gas conversion treatment.

4. The process of obtaining normally liquid low-boiling hydrocarbons suitable for use as motor fuel from hydrocarbon oil which comprises subjecting said hydrocarbon oil to pyrolytic conversion treatment to form hydrocarbons suitable as gasoline constituents, fractionating the products of said conversion treatment to separate therefrom a gasoline fraction, a normally liquid fraction higher boiling than gasoline and a gaseous fraction containing saturated and unsaturated hydrocarbons having two to four carbon atoms per molecule, introducing said gaseous fraction into a fractionating zone at a point intermediate the upper and lower portions thereof, fractionating said gaseous fraction in said zone into a light gas fraction and a liquefied gas fraction predominating in hydrocarbons having two to four carbon atoms per molecule, withdrawing a liquefied side stream from said fractionating zone at a point intermediate the upper and lower portions thereof, heating the liquefied gases collected in the lower portion of the fractionating zone to strip therefrom light constituents, withdrawing said liquefied gases stripped of light constituents from said fractionating zone, cooling said withdrawn liquefied gases, introducing said cooled liquefied gases into the upper portion of said fractionating zone whereby said cooled liquefied gases pass downwardly through said fractionating zone in intimate contact with the gases ascending said fractionating zone to effect condensation and absorption of hydrocarbons having two to four carbon atoms per molecule, separately subjecting said withdrawn side stream to polymerizing conditions of temperature and pressure to effect conversion thereof to normally liquid products including gasolinelike material, and admixing the normally liquid products of said polymerization treatment and normally gaseous products of said polymerization treatment including hydrocarbons having two to four carbon atoms per molecule with the products of said hydrocarbon oil conversion treatment during the fractionation thereof whereby the said gasoline-like constituents of the polymerization products are recovered with the gasoline fraction of the hydrocarbon oil conversion products and normally gaseous constituents of the polymerization products suitable for further polymerization treatment in said polymerizing step are recovered with similar constituents of the hydrocarbon oil conversion products.

5. The method in accordance with claim 4 wherein said first-mentioned normally gaseous fraction is first separated into a liquid fraction and a gaseous fraction, said liquefied fraction is introduced into said fractionating zone at an intermediate point adjacent the lower portion thereof and said gaseous fraction is introduced to the fractionating zone at an intermediate point adjacent the upper portion thereof.

6. The method in accordance with claim 4 wherein said liquefied side stream is heated externally of said fractionating zone to strip light constituents therefrom, said light constituents are returned to said fractionating zone at a point intermediate the upper and lower portions thereof, and the remaining liquefied portion stripped of light constituents is passed to said polymerization treatment.

7. A process of producing normally liquid gasolinelike hydrocarbons from normally gaseous hydrocarbons which comprises passing normally gaseous hydrocarbons comprising saturated and unsaturated constituents of from two to four carbon atoms per molecule through a heating zone and subjecting said hydrocarbons to elevated temperatures and pressures to effect polymerization thereof into gasolinelike constituents, cooling said products of polymerization, separating the products of said polymerization into a gaseous fraction and a liquid fraction, passing said gaseous fraction directly into an enlarged zone having upper and lower sections, subjecting said gaseous fraction in the upper section of the enlarged zone to rectification and scrubbing, flowing liquefied constituents of said gaseous fraction into the lower section of said enlarged zone, heating the said liquefied constituents in the lower section of said enlarged zone to strip therefrom low-boiling hydrocarbons and to leave a residue consisting primarily of relatively high-boiling normally gaseous hydrocarbons, passing liquid constituents thus stripped of low-boiling materials to the upper section of said enlarged zone in liquid condition as scrubbing medium, removing hydrogen and methane from the upper section of said enlarged zone, withdrawing a liquefied fraction consisting primarily of hydrocarbons having from two to four carbon atoms per molecule from a point intermediate the upper and lower sections of said enlarged zone, and passing hydrocarbons thus withdrawn to said heating zone.

8. The method in accordance with claim 7 wherein the liquid fraction separated from the products of polymerization is further fractionated to separate therefrom the normally liquid hydrocarbons comprising gasoline constituents and normally gaseous hydrocarbons, and a portion of said last-mentioned normally gaseous hydrocarbons is returned to said heating zone.

9. A process of producing normally liquid gasolinelike hydrocarbons from normally gaseous hydrocarbons which comprises passing normally gaseous hydrocarbons comprising saturated and unsaturated constituents of from two to four carbon atoms per molecule to a heating zone and subjecting said hydrocarbons to elevated temperature to effect polymerization thereof into gasolinelike constituents, fractionating the products of polymerization to separate therefrom a normally liquid fraction including gasolinelike constituents and a normally gaseous fraction containing saturated and unsaturated hydrocarbons of from two to four carbon atoms per molecule, introducing said gaseous fraction into a fractionating zone at a point intermediate the upper and lower portions thereof, fractionating said gaseous fraction in said zone into a light gas fraction and a liquefied gas fraction predominating in hydrocarbons having from two to four carbon atoms per molecule, withdrawing a liquefied side stream from said fractionating zone at a point intermediate the upper and lower portions thereof, passing the side stream thus withdrawn to said heating zone, heating the liquefied hydrocarbons collected in the lower portion of said fractionating zone to strip light constituents from the liquefied gases, withdrawing said liquefied gases stripped of light constituents from the said fractionating zone, cooling said withdrawn liquefied gases, and introducing said cooled liquefied gases into the upper portion of said fractionating zone whereby said cooled liquefied gases pass downwardly through said fractionating zone in intimate contact with the gases ascending said fractionating zone to effect condensation and absorption of hydrocarbons having two to four carbon atoms per molecule.

10. The method in accordance with claim 9 wherein said first-mentioned gaseous fraction is first separated into a liquefied fraction and a gaseous fraction, said liquefied fraction is introduced into said fractionating zone at an intermediate point adjacent the lower portion thereof and said gaseous fraction is introduced into said fractionating zone at an intermediate point adjacent the upper portion thereof.

11. The method in accordance with claim 9 wherein said liquefied side stream is heated externally of said fractionating zone to strip light constituents therefrom, said light constituents are returned to said fractionating zone at a point intermediate the upper and lower portions thereof, and the remaining liquefied portion stripped of light constituents is passed to said polymerizing treatment.

PERCIVAL C. KEITH, JR.